United States Patent [19]

Holmes

[11] Patent Number: 4,826,474

[45] Date of Patent: May 2, 1989

[54] FORKLIFT APPARATUS FOR UNLOADING ARTICLES FROM AN ELEVATED SURFACE

[75] Inventor: Arthur J. Holmes, Richmond, Tex.

[73] Assignee: Butterworth Jetting Systems, Inc., Houston, Tex.

[21] Appl. No.: 132,420

[22] Filed: Dec. 14, 1987

[51] Int. Cl.[4] .......................... B65G 67/02; B66F 7/08

[52] U.S. Cl. .................................... 414/699; 180/282; 414/340; 414/467; 414/697; 414/708; 414/718

[58] Field of Search ............... 414/572, 373, 340, 685, 414/697, 698, 699, 700, 706, 708, 718, 467; 180/282, 283, 284, 285

[56] References Cited

U.S. PATENT DOCUMENTS

| | | | |
|---|---|---|---|
| 2,531,993 | 11/1950 | Smith | 414/685 |
| 2,990,072 | 6/1961 | Mindrum | 414/708 |
| 3,067,887 | 12/1962 | Quayle | 414/699 X |
| 3,261,485 | 7/1966 | Anderson | 414/718 |
| 3,325,022 | 6/1967 | Henriksson et al. | 414/373 X |
| 3,534,881 | 10/1970 | Horsh | 414/699 |
| 3,606,049 | 9/1971 | Gordon | 414/699 X |
| 3,650,425 | 3/1972 | Hallman et al. | 414/699 |
| 3,826,393 | 7/1974 | Carroll | 414/632 |
| 3,883,023 | 5/1975 | Bernhoft | 414/699 |
| 3,908,849 | 9/1975 | Carroll | 414/634 |
| 4,018,350 | 4/1977 | Brown | 414/697 |
| 4,042,135 | 8/1977 | Pugh et al. | 414/718 |
| 4,231,450 | 11/1980 | Hedtke et al. | 180/282 X |
| 4,257,732 | 3/1981 | Steffanson | 414/685 X |
| 4,377,043 | 3/1983 | Inui et al. | 414/699 X |
| 4,382,743 | 5/1983 | Newell | 414/718 X |
| 4,392,541 | 7/1983 | Barchard | 180/209 |
| 4,395,190 | 6/1983 | Barchard | 414/661 X |
| 4,402,644 | 9/1983 | Barchard | 414/661 X |
| 4,423,997 | 1/1984 | Pemberton | 414/697 |
| 4,547,118 | 10/1985 | Pittenger | 414/685 X |
| 4,553,899 | 11/1985 | Magni | 4141/718 X |
| 4,561,824 | 12/1985 | Okabe et al. | 414/697 |

FOREIGN PATENT DOCUMENTS

| | | | |
|---|---|---|---|
| 2645790 | 4/1978 | Fed. Rep. of Germany | 414/699 |
| 2817196 | 10/1979 | Fed. Rep. of Germany | 414/700 |
| 3035543 | 5/1982 | Fed. Rep. of Germany | 414/698 |
| 942139 | 11/1963 | United Kingdom | 414/685 |
| 1384461 | 2/1975 | United Kingdom | 414/700 |
| 1420851 | 1/1976 | United Kingdom | 414/708 |
| 2033871 | 5/1980 | United Kingdom | 414/685 |

*Primary Examiner*—Leslie J. Paperner
*Attorney, Agent, or Firm*—Hubbard, Thurman, Turner & Tucker

[57] ABSTRACT

An improved forklift device for unloading palletized articles from the bed of a flatbed truck may be removably carried in "piggyback" fashion on the rear end of the truck. The device has a fork structure adapted to liftingly engage one of the pallets, a wheeled, ground-supportable frame, and an articulated linkage structure which interconnects the frame and the fork structure and is movable between a fully lowered and rearwardly retracted position and a fully raised and forwardly extended position. The forklife may be propelled along the ground by an engine-driven hydraulic drive system, and is also provided with a hydraulic actuating system for pivoting gantry and boom portions of the linkage, and pivoting the fork structure relative to the linkage. In unloading the articles the fork structure may be moved a substantial distance laterally across the truck bed to liftingly engage the pallet of an article on the far side of the bed. The removed load may be lowered using an automatic mode portion of the actuation system which moves the articulated linkage to its fully lowered and retracted position while maintaining the fork structure in a fixed pivotal orientation relative to the ground. The forklift is provided with a variety of safety features including an anti-tipping system which senses a tipping load moment and responsively prevents the actuating system from moving the articulated linkage in a manner appreciably increasing such load moment, and preventing movement of the forklift away from the truck during unloading of an article.

14 Claims, 7 Drawing Sheets

FORKLIFT APPARATUS FOR UNLOADING ARTICLES FROM AN ELEVATED SURFACE

BACKGROUND OF THE INVENTION

The present invention relates generally to material handling devices, and more particularly provides an improved forklift device which may be removably secured to the rear end of a flat bed truck for transport therewith, and then removed from the truck and used to unload articles carried on its bed portion.

Forklift devices of this general type are known in the material handling art, and one such device is illustrated and described in U.S. Pat. No. 4,395,190 to Barchard, while other related forklift apparatus is shown in U.S. Pat. No. 3,826,393 to Carroll, U.S. Pat. No. 3,908,849 to Carroll, U.S. Pat. No. 4,402,644 to Barchard, and U.S. Pat. No. 4,392,541 to Barchard.

The forklift illustrated in U.S. Pat. No. 4,395,190 to Barchard has an articulated frame in which a pair of front drive wheels are pivotally connected to the balance of the frame so that the wheels can be raised or lowered to horizontally lengthen or shorten the frame. Carried on a horizontally central portion of the frame is a vertically extending mast structure which supports a pair of forwardly extending lifting forks that may be moved upwardly or downwardly along the mast structure. The forks are telescoped within a pair of sleeve elements which may be hydraulically extended or retracted relative to the forks to increase or decrease the effective horizontal reach thereof.

To unload a palletized article resting on the bed of a flat bed truck adjacent its "near side" edge, a relatively simple and straightforward unloading technique is used in which the Barchard forklift is driven toward the near side truck bed edge, with the fork extensions positioned at the pallet level, until the fork extensions enter the pallet openings. The fork extensions are then moved upwardly against the mast structure to lift the article upwardly from the truck bed. Finally, the forklift is backed away from the truck and driven to an unloading location, and the article is lowered to the ground and removed from the forks.

The unloading of "far side" articles from adjacent the near side of the truck bed, however, is considerably more complex and difficult. To unload a far side article, the forks are elevated to an appropriate level and the front drive wheels are downwardly pivoted so that the mast structure is moved upwardly and brought horizontally closer to the front wheels of the fork lift so that the mast structure can be brought closer to the near side of the truck bed. The fork extensions are then moved horizontally across the upper surface of the truck and inserted into the pallet of the far side article to be unloaded. The forks are then lifted to lift the article a short distance above the truck bed and the fork extensions are then retracted to move the supported article toward the mast structure. When the fork extensions have been retracted, the fork lift is then backed away from the truck as previously described for near side article unloading.

One of the problems often encountered in this far side unloading process is that the far side article, when initially lifted, tends to tip the fork lift forwardly due to the forward shift of its center of gravity caused by downwardly pivoting the drive wheels, and the rather large forward extension of the fork structure. Because of this tendency to forwardly tip, the far side article often cannot be completely lifted off the truck bed and then carried rearwardly by retracting the fork extensions. Accordingly, it is often necessary to use the fork extensions to exert only a partial lifting load on the far side article and then attempt to drag the article across the upper truck bed surface toward the near side edge of the bed by retracting the fork extensions. This rather delicate operation can create a variety of undesirable results such as damaging the upper surface of the truck bed, pulling the fork extensions out of the pallet, or repeatedly tipping the forklift about its front wheels.

Additionally, even if the far side article is successfully moved to adjacent the near side edge of the truck bed, the previous forward movement of the mast structure relative to the forklift front drive wheels creates a concomitant forward shift in the center of gravity of the forklift so that when the article is lifted from the truck bed the resulting tipping load moment created by the article is resisted by a substantially reduced opposite moment created by the weight of the forklift itself. Accordingly, the forklift stability after the article has been lifted off the truck bed is substantially diminished.

Thus, while the Barchard forklift is capable of reaching across a truck bed to engage and rearwardly move an article, it is far easier and more desirable simply to drive the forklift around to the far side of the truck bed so that the far side article becomes a greatly more accessible and maneuverable "near side" article. This, of course, adds significantly to the unloading time required to remove all of the articles from the truck bed.

It is accordingly an object of the present invention to provide improved forklift apparatus which can more safely, conveniently and quickly unload both near side and far side articles from a truck bed from the same side of the truck to thereby significantly reduce the total truck unloading time.

SUMMARY OF THE INVENTION

In carrying out principles of the present invention, in accordance with a preferred embodiment thereof, an improved forklift is provided which may be removably mounted, in "piggyback" fashion, on the rear end of a flat bed truck, and then removed and utilized to quickly, conveniently and very safely unload all of the palletized articles carried on the truck bed from a single, selected side of the bed.

The improved forklift of the present invention includes a rigid, fixed geometry frame having a rear section, and a generally U-shaped front section with a rear base portion secured to the rear frame section and a pair of forwardly projecting, laterally spaced support arms. The frame is movably supported on the ground by a pair of pivotally mounted rear caster wheels secured to the underside of the rear frame section, and a pair of front drive wheels rotatably secured to the outer forward ends of the frame support arms. The forklift is drivable and steerable along the ground by a hydraulic drive system which is powered by a diesel engine carried on the rear frame section, the drive circuit being operatively connected to a pair of hydraulic drive motors drivingly connected to the front wheels.

An articulated linkage structure is secured to the rear frame section for movement therewith and includes an upwardly projecting, generally inverted U-shaped gantry having an upper base portion and a pair of downwardly extending leg portions pivotally connected at their lower ends to the rear frame section. A pair of elongated boom arms are pivotally connected at their rear, inner ends to the upper base portion of the gantry, and pivotally connected at their front, outer ends to a fork support structure from which a pair of lifting forks forwardly extend.

The gantry is pivotally drivable in forward and reverse directions relative to the frame by means of a pair of hydraulic actuating cylinder and rod assemblies pivotally interconnected between the rear frame section and longitudinally intermediate portions of the downwardly extending gantry legs. In a similar fashion, the boom arms are pivotally drivable by means of a pair of hydraulic actuating cylinder and rod assemblies pivotally interconnected between the rear frame section and longitudinally central portions of the boom arms. The fork support structure is pivotally drivable relative to the outer ends of the boom arms by means of a pair of hydraulic actuating cylinder and rod assemblies pivotally interconnected between outer end portions of the boom arms and the fork support structure.

The three pairs of hydraulic actuating cylinder and rod assemblies are driven by a hydraulic actuation system which is powered by the diesel engine. The actuation system includes a manual portion by means of which the cylinder and rod pairs may be selectively and independently operated to selectively and independently pivot the gantry relative to the frame, the boom arms relative to the gantry, and the fork support structure relative to the boom arms. The actuation system also includes a "programmed" portion which may be utilized to automatically move the articulated linkage structure between a fully lowered and rearwardly retracted position and a fully raised and forwardly extended position. This programmed portion of the hydraulic actuation system, in moving the articulated linkage between these two limit positions, operates to simultaneously pivot the gantry relative to the frame, the boom arms relative to the gantry, and the fork support structure relative to the outer ends of the boom arms in a manner maintaining a constant, predetermined pivotal orientation of the lifting forks relative to the ground during the pivotal motion of the gantry and the boom arms to thereby prevent inadvertent forward tilting of the lifting forks in a manner dumping a load carried thereby.

The unloading of near side palletized articles carried on the truck bed is carried out by using the manual portion of the actuation system to lift the forks to the level of a near side article pallet and move the forks slightly forwardly of the front drive wheels of the forklift. The forklift is then driven forwardly toward the near side edge of the truck bed to insert the forks in the pallet of the near side article. The forks are then pivoted rearwardly to rearwardly tilt the article. Next, the gantry is pivoted rearwardly to cause the boom arms to lift and rearwardly move the fork-supported near side article relative to the truck bed. The forklift is then backed away from the truck bed and the programmed mode of the hydraulic actuation system is used to lower and rearwardly retract the articulated linkage toward its fully lowered and retracted position. The forklift may then be driven to an unloading location and the article further retracted and lowered to the ground so that the forklift may be backed away from the article to remove the forks from its pallet.

In unloading a far side article from the truck bed, the manual portion of the hydraulic actuation system is used to elevate the forks to the level of the far side article pallet and move the forks forwardly of the forklift drive wheels a substantially greater distance than that used in the near side unloading process. The forklift is then driven forwardly toward the near side edge of the truck bed until the elevated forks are moved across the truck bed surface into operative engagement with the far side article pallet. The forks are then rearwardly tilted to rearwardly tilt the far side article. This rearward tilting of the forks downwardly pivots a support roller carried by the fork support structure into engagement with the upper surface of the truck bed so that the far side article, its pallet, and an outer end portion of the boom arms is supported on the lowered roller.

After the roller has been lowered in this manner, the forklift operator energizes a roll-off dump valve portion of the actuation system to deenergize the boom cylinders so that they no longer exert an upward supporting force on the boom arms. Next, the operator rearwardly pivots the gantry which causes the fork-supported far side article to be rolled along the truck bed toward the near side edge thereof.

When the roller is brought close to the near side truck bed edge, the operator de-energizes the roll-off dump valve so that the boom rods once again exert a supporting force on the boom arms. The operator then rearwardly pivots the gantry to slightly lift and rearwardly move the article. Finally, the operator backs the forklift away from the truck bed and utilizes the programmed portion of the actuation system to lower the article to the ground as previously described.

To prevent the operator from inadvertently rolling the load off the near side edge of the truck bed with the boom in an unsupported condition, a microswitch is operatively secured to the fork support structure and is positioned to be closed by engagement with the upper truck bed surface when the roller is in its down position. Closure of the microswitch in this manner permits the roll-off dump valve to de-energize the boom cylinders. However, if the roller is lifted from the truck bed, or is rolled rearwardly off its near side edge, the microswitch opens and responsively closes a safety valve which is connected in series with the roll-off dump valve to prevent the dump valve from de-energizing the boom cylinders. In this manner, if the operator inadvertently continues to roll the far side article off the near side edge, as soon as the rollers pass the near side edge, the now-open microswitch immediately causes the boom cylinder rods to again vertically support the boom arms.

This roller feature of the improved forklift of the present invention provides it with a significant advantage over forklift devices which, in unloading far side articles from the near side of the truck bed, must lift and/or drag the article rearwardly across the truck bed to bring the article to a position in which the forklift may be driven rearwardly away from the truck bed. Specifically, it can be seen that the unique support roller of the present invention causes the weight of the far side article, during its movement along the truck bed toward the forklift, to be essentially entirely supported by the truck bed itself. This precludes any forward instability occasioned by excessive load moment. Thus, even with the articulated linkage extended far forwardly of the forklift frame, there is no tendency whatever for the forklift to forwardly tip during this phase of the unloading process.

The improved forklift, in addition to these novel far side unloading capabilities, also has a variety of unique built-in safety features which function to prevent load-caused tipping of the forklift. These safety features include anti-tipping means in the form of a load moment safety sensing system incorporated into the hydraulic actuation system. Such safety sensing system functions to sense the tipping load imposed on the forklift by an item supported by its lifting forks, and responsively prevent the actuation system from moving the articulated linkage portion of the forklift toward a more unstable position.

More specifically, the anti-tipping means function to sense the hydraulic pressures within the base sides of the gantry and boom actuating cylinders and responsively null the rod side and base side cylinder portions, respectively, of the gantry and boom cylinders when the two sensed hydraulic pressures are each at or above a predetermined level thereof. The nulling of the gantry and boom supply lines in this manner prevents the actuation system (whether the manual or the programmed portion thereof is being utilized) from causing either a further forward pivotal motion of the gantry relative to the forklift frame, or a further upward pivotal motion of the boom arms relative to the gantry either or both of which would move the articulated linkage to a less stable position. The anti-tipping means thus function to maintain a load carried by the forks within a "safe" zone in which the load-caused tipping moment on the forklift is less by a predetermined amount than the oppositely directed moment created by the weight of the forklift structure itself.

Additional safety means are provided in the form of reverse lockout means which function to prevent the forklift from being backed away from the truck bed in the event that a nulling signal is generated by the anti-tipping means as an article is being lifted and rearwardly moved from the truck bed by a rearward pivotal motion of the gantry. The nulling signal generated by the anti-tipping system is transmitted to a solenoid-actuated locking pin to extend the pin rearwardly of and block a T-handle which is ordinarily pivoted rearwardly to back the forklift away from the truck during the unloading process. Thus, if an article being lifted and rearwardly moved from the truck bed by a rearward pivotal motion of the gantry relative to the forklift frame is too heavy, or if the forks are moved too far forwardly of the front drive wheels of the forklift to safely lift the weight of the article, rearward movement of the forklift, which would cause it to tip forwardly, is positively prohibited.

Additionally, to prevent the outer ends of the boom arms from striking the rear base portion of the front frame section as the articulated linkage is being moved toward its fully lowered and retracted position, a proximity sensor is mounted on the outer end portion of one of the boom arms and, when it is brought into engagement with the rear portion of the front frame section, nulls the rod side supply line of the boom cylinders to prevent further pivotal motion of the boom arms toward the base portion of the front frame section.

After the articles on the truck bed have been unloaded, the improved forklift may be re-mounted on the back end of the truck bed by simply inserting the lifting forks into support channels secured to the underside of the truck bed, lowering the boom arms to raise the front drive wheels of the forklift, actuating the fork tilt cylinders to raise the rear caster wheels, and then interconnecting suitable safety chains between the rear end of the truck bed and the forklift frame. The piggybacked forklift may then be carried away with the truck until it is again needed to unload articles from the truck bed.

BRIEF DESCRIPTION OF THE DRAWINGS

FIGS. 9A through 9C are simplified schematic side elevational views of the forklift which further illustrate the pivotal movement of gantry and boom portions of its articulated linkage structure; and FIGS. 10A through 10C are simplified schematic side elevational views of the forklift and sequentially illustrate the re-mounting, in "piggyback" fashion, of the forklift onto the rear end of the unloaded truck.

DETAILED DESCRIPTION

Figure 1:
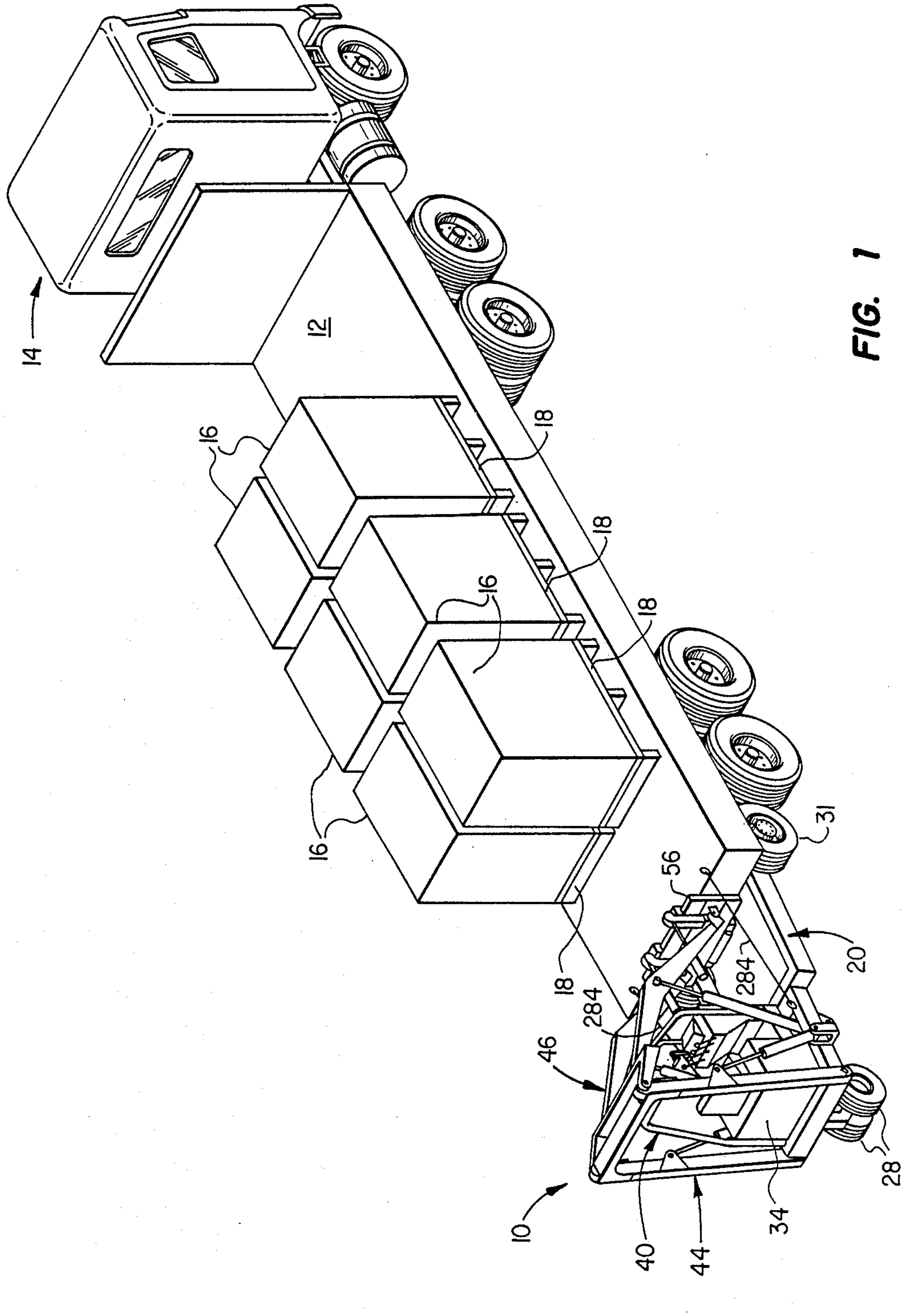
FIG. 1 is a perspective view of an improved forklift device of the present invention which is removably supported on the rear end of a flatbed truck and used to remove pallet-supported articles from the truck bed.

Perspectively illustrated in FIG. 1 is an improved forklift device 10 which, in a manner subsequently described, is removably mountable in "piggyback" fashion on the rear end of the bed 12 of a flat bed truck 14 for transport therewith. The forklift 10, after its removal from the truck 14 is used to unload articles such as crates 16 arranged in two side-by-side, longitudinally extending rows on the truck bed, with each of the articles 16 being supported on a conventional pallet 18. After the unloading process is completed, the forklift 10 may be quickly and easily re-mounted on the rear end of the truck bed 12 and conveniently carried away by the truck.

Figure 2:
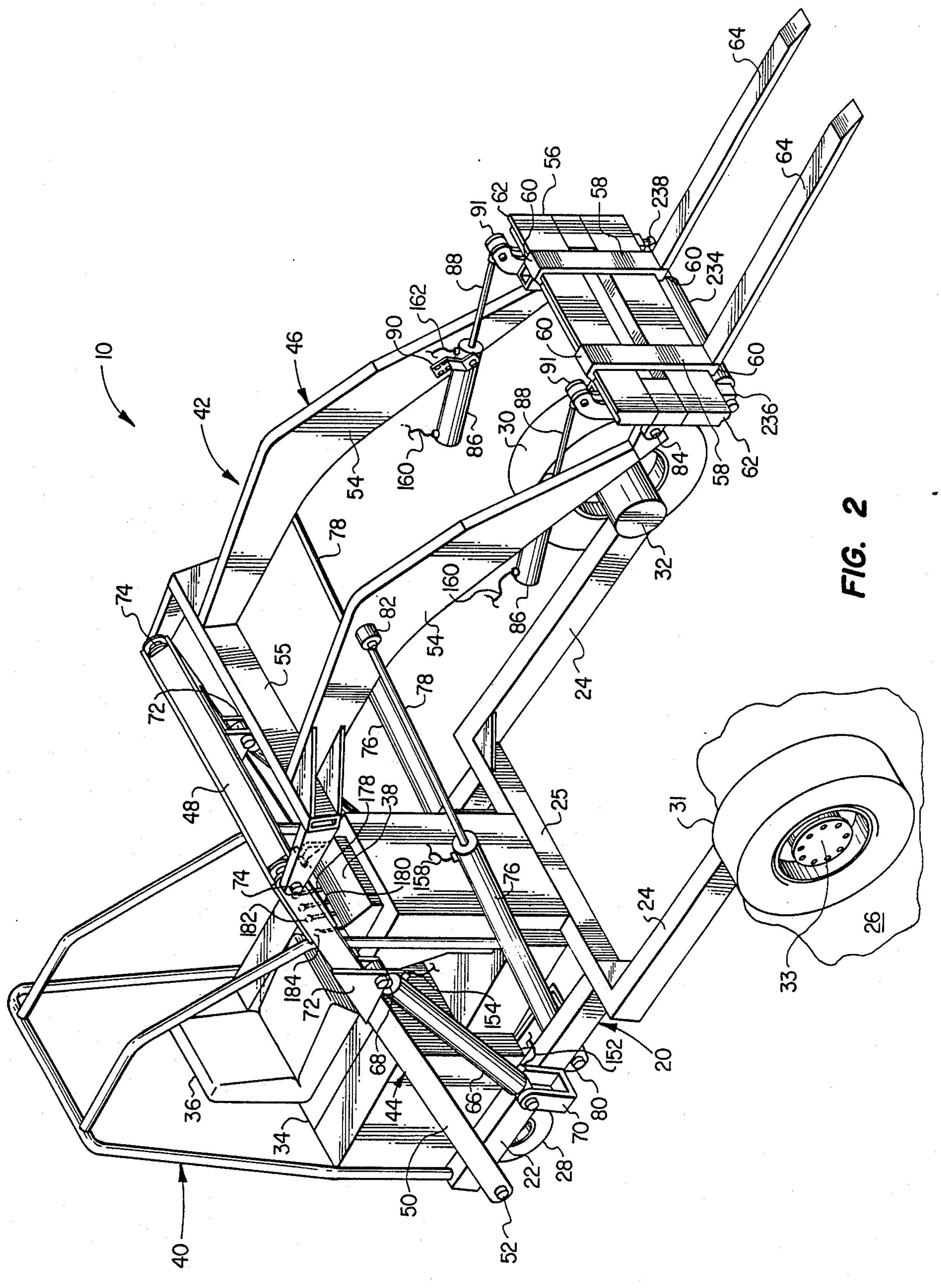
FIG. 2 is an enlarged scale right front perspective view of the forklift removed from the truck and ready for an unloading operation.
Figures 3, 4, 5:
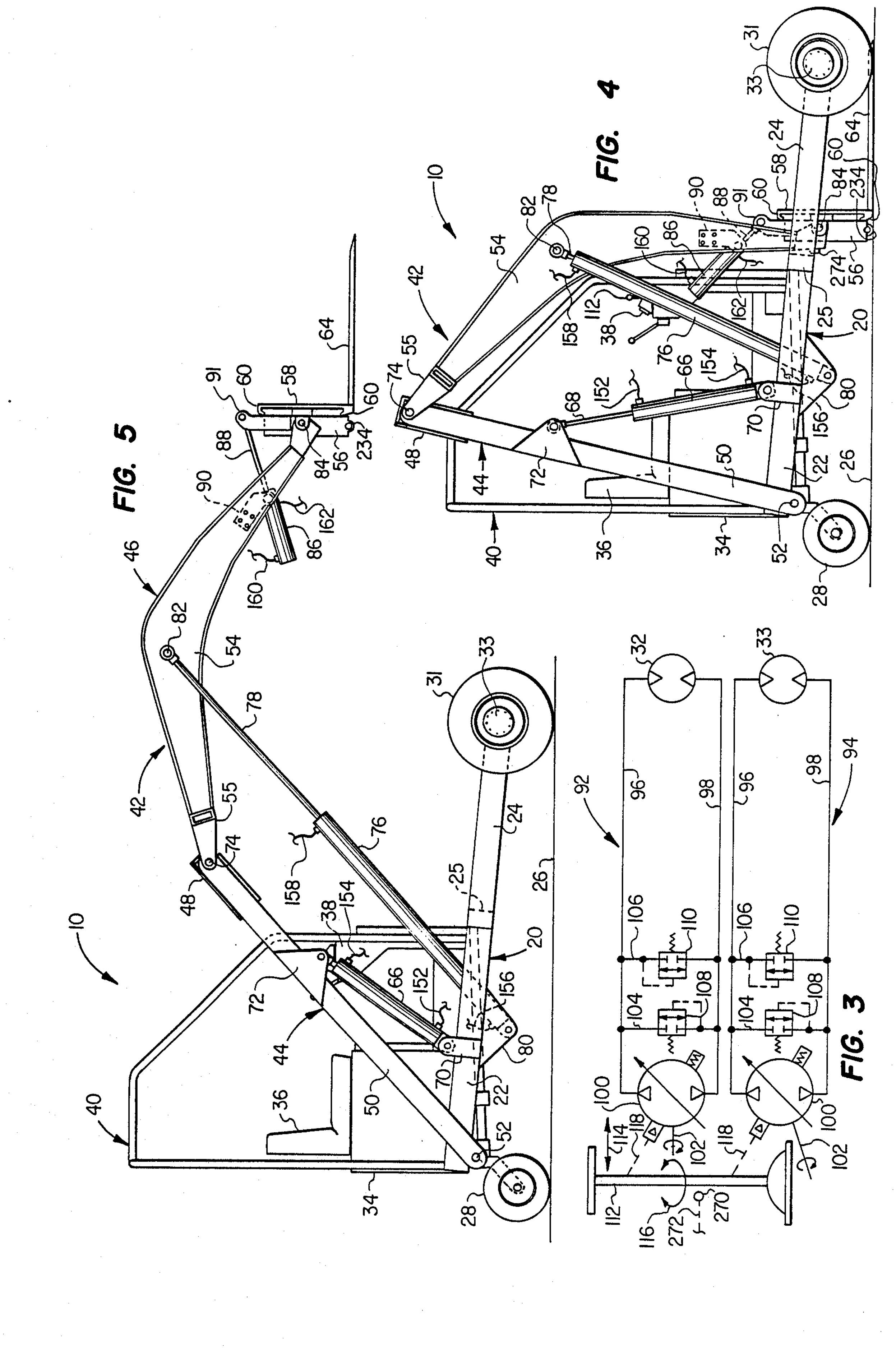
FIG. 3 is a schematic diagram of a hydraulic drive circuit used to propel and steer the forklift along the ground.
FIG. 4 is a reduced scale, simplified side elevational view of the forklift with an articulated linkage portion thereof it its fully lowered and rearwardly retracted position.
FIG. 5 is a view similar to that in FIG. 4 but with the articulated linkage in its fully raised and forwardly extended position.

Referring now to FIGS. 2 and 4, the forklift 10 is provided with an elongated frame portion 20 having a rear section 22 and a generally U-shaped front section defined by a pair of laterally spaced, forwardly projecting front support arms 24 secured at their back ends to opposite ends of a base portion 25. The rear frame section 22 is movably supported on the ground 26 by means of a pair of caster wheels 28 which are pivotally connected in a conventional manner to the underside of the frame section 22. The front end of the frame 20 is movably supported on the ground by means of a pair of somewhat larger diameter left and right drive wheels 30, 31 which are rotatably secured to the outer ends of the support arms 24 and are respectively provided with hub-mounted hydraulic drive motors 32 and 33. As illustrated, the wheel-supported frame 20 is slightly canted in a forward and downward direction.

Mounted atop the rear frame section 22 is a diesel engine 34 which is positioned within a suitable engine housing. An operator's seat 36 is secured to the top of the engine housing and is positioned rearwardly of a control panel 38 used to control the movements of various components of the forklift 10 in a manner subsequently described. A suitable safety roll bar cage 40 is also secured to the frame 20 and surrounds the seat 36 and control panel 38 to protect an operator sitting in the seat.

The forklift 10 is also provided with an articulated linkage structure 42 which includes an elongated gantry section 44 and an elongated boom section 46. The gantry 44 has a generally inverted U-shaped configuration defined by a horizontally extending upper base portion 48 having a pair of elongated leg portions 50 depending from its opposite ends. The gantry legs 50 are positioned laterally outwardly of the opposite sides of the roll bar cage 40 and are pivotally connected at their lower ends to the back end of the frame section 22 at outboard points 52 thereon. This pivotal connection of the gantry to the frame permits the gantry to be pivoted forwardly and rearwardly relative to the frame, the gantry being configured to clear the roll bar cage 40 during such pivotal motion.

The boom section 46 is defined by a pair of elongated, generally boomerang-shaped arms 54 which are downwardly bent along longitudinally central portions thereof and extend forwardly from the upper end of the gantry 44. Boom arms 54 are laterally spaced from one another and are secured at their inner ends to a U-shaped bracket 55 pivotally connected to the gantry legs 50 adjacent their junctures with the gantry base portion 48. The forwardly positioned outer ends of the boom arms 54 are pivotally connected to a vertically central portion of a generally rectangular fork support structure 56. A pair of fork support brackets 58 are secured to the front side of the support structure 56 by means of rearwardly projecting side edge lip portions 60 on the brackets 58 which slidingly receive elongated upper and lower side edge rib portions 62 on the support structure 56. Brackets 58 are suitably anchored to the fork support structure 56. Secured to lower side edge portions of the brackets 58, and projecting forwardly therefrom, are a pair of lifting fork elements 64 which are adapted to be received in the fork openings formed in each of the pallets 18 to thereby liftingly engage the pallet and the article 16 supported thereon.

The gantry 44 is pivotally drivable in forward and reverse directions relative to the frame 20 by means of a pair of hydraulic actuating cylinders 66 having actuating rods 68. The outer ends of the cylinders 66 are pivotally connected to upwardly projecting outboard pivot members 70 anchored to opposite sides of the rear frame section 22, while the outer ends of the rods 68 are pivotally connected to pivot members 72 anchored to the gantry legs 50. It can be seen that extension of the rods 68 causes rearward pivotal motion of the gantry 44 about the gantry leg pivot points 52, while retraction of the rods 68 causes forward pivoting of the gantry.

The laterally spaced boom arms 54 may be pivotally driven upwardly and downwardly relative to the gantry 44, about the boom pivot points 74 thereon, by means of a pair of hydraulic actuating cylinders 76 having actuating rods 78. The outer ends of the cylinders 76 are pivotally connected to downwardly projecting inboard pivot support members 80 anchored to opposite sides of the rear frame section 22 and positioned slightly forwardly of the pivot support members 70. The outer ends of the rods 78 are pivotally connected to pivot pin elements 82 anchored to longitudinally intermediate portions of the boom arms 54. Extension of the rods 78 pivots the boom arms 54 upwardly relative to the gantry 44 about the pivot points 74, while retraction of the rods 78 pivots the boom arms 54 downwardly relative to the gantry about the pivot points 74. It can be seen that the gantry legs 50, inner longitudinal portions of the boom arms 54 between the pivot points 74 and 82, the actuating cylinders and rods 76 and 78, and side portions of the rear frame section 22 extending generally between the pivot points 52 and the cylinders 76 define pivotally drivable four bar linkages on opposite sides of the forklift frame.

The fork support structure 56, 58 may be pivotally driven about the pivot points 84 at the outer end of the boom arms 54 to upwardly or downwardly tilt the forks 64 by means of a pair of hydraulic actuating cylinders 86 having actuating rods 88. Inner end portions of the cylinders 86 are pivotally connected to inboard trunnion structures 90 anchored to the boom arms adjacent their outer ends, while the outer ends of the rods 88 are pivotally connected to upwardly projecting pivot support brackets 91 anchored to the fork support structure 56. It can be seen that extension of the rods 88 causes a clockwise tilting of the forks 64, while retraction of the rods 88 causes a counterclockwise tilting of the forks.

Referring now to FIG. 3, the diesel engine 34 is utilized to drive the left and right front wheel motors 32 and 33, respectively, through a pair of hydraulic drive circuits 92 and 94 which are schematically depicted in FIG. 3. Each of the circuits 92 and 94 includes a pair of hydraulic lines 96 and 98 which interconnect opposite sides of the drive motor to opposite sides of a variable displacement swash plate pump 100 which is rotationally driven, via suitable drive linkage 102, by the diesel engine 34. Each of the pairs of hydraulic lines 96 and 98 are interconnected across their associated pump 100 by a pair of lines 104 and 106 in which pilot operated crossover relief valves 108 and 110 are respectively interposed. In a conventional manner, the valves 108 and 110 function to protect their associated drive motor by opening in response to the presence of an undesirably high pressure within one of the lines 96 and 98 to thereby cause the pump to simply cycle hydraulic fluid from the pump, through one of the lines 108 and 110, and then back to the pump.

The operation of the pumps 102 is controlled by a T-handle member 112 located on the control panel 38 (see also FIG. 4) which may be pivoted forwardly and rearwardly as indicated by the double-ended arrow 114 in FIG. 3, and twisted in opposite directions as indicated by the double-ended arrow 116. The handle member 112 is mechanically interconnected with the pumps 100 by means of a pair of control cable members 118 and is used to control both the direction of hydraulic flow through the drive motors 32 and 33 and the relative flow rates through the circuits 92 and 94 to propel and steer the forklift 10 along the ground 26.

For example, if it is desired to move the forklift forwardly while making a left turn, the handle member 112 is pivoted forwardly (i.e., rightwardly in FIG. 3) and simultaneously twisted in a counterclockwise direction as viewed from the top of the handle. This motion of the control handle 112 causes operation of the pumps 100 to create hydraulic flow through the motors 32, 33 in the same directions around the circuits 92, 94 (to drive the forward wheels in a clockwise direction as viewed in FIG. 4), while at the same time increasing the flow rate through circuit 94 compared to that in circuit 92. This causes the right drive wheel to rotate at a higher speed than the left drive wheel to thereby turn the forklift in a leftward direction while moving forwardly. During such turn, the rotating rear caster wheels 28 are pivoted in the usual manner about a vertical axis relative to the forklift frame. In a similar manner, the forklift may be propelled rearwardly, and turned in either direction, simply by moving the control handle member 112 rearwardly (i.e., to the left in FIG. 3) while twisting it in an appropriate direction.

Referring now to FIGS. 4 and 5, it can be seen that the articulated linkage 42 may be moved between a fully lowered and rearwardly retracted position (FIG. 4) and a fully raised and forwardly extended position (FIG. 5). In the fully lowered retracted position of the articulated linkage structure, the gantry cylinder rods 68 are fully extended, the boom 46 is pivoted downwardly relative to the gantry, the boom cylinder rods 78 are fully retracted, and the forks 64 are positioned between the front frame support arms 24 and are on the ground 26 with the fork support structure 56 being closely adjacent the inner base portion 25 of the front section of the frame 20.

In the fully raised and extended position of the articulated linkage structure 42 depicted in FIG. 5, the gantry 44 is pivoted forwardly with the gantry cylinder rods 68 in their fully retracted positions, the boom 46 is moved forwardly and pivoted upwardly with the boom cylinder rods 78 in their fully extended positions, and the forks 64 have been moved upwardly and forwardly a substantial distance relative to their FIG. 4 positions. The pivotal movement of the articulated linkage structure between these two limit positions, together with selected pivotal movement of the fork support structure 56 and 58, is effected by a hydraulic actuation circuit 120 which is schematically depicted in FIG. 6.

Figure 6:
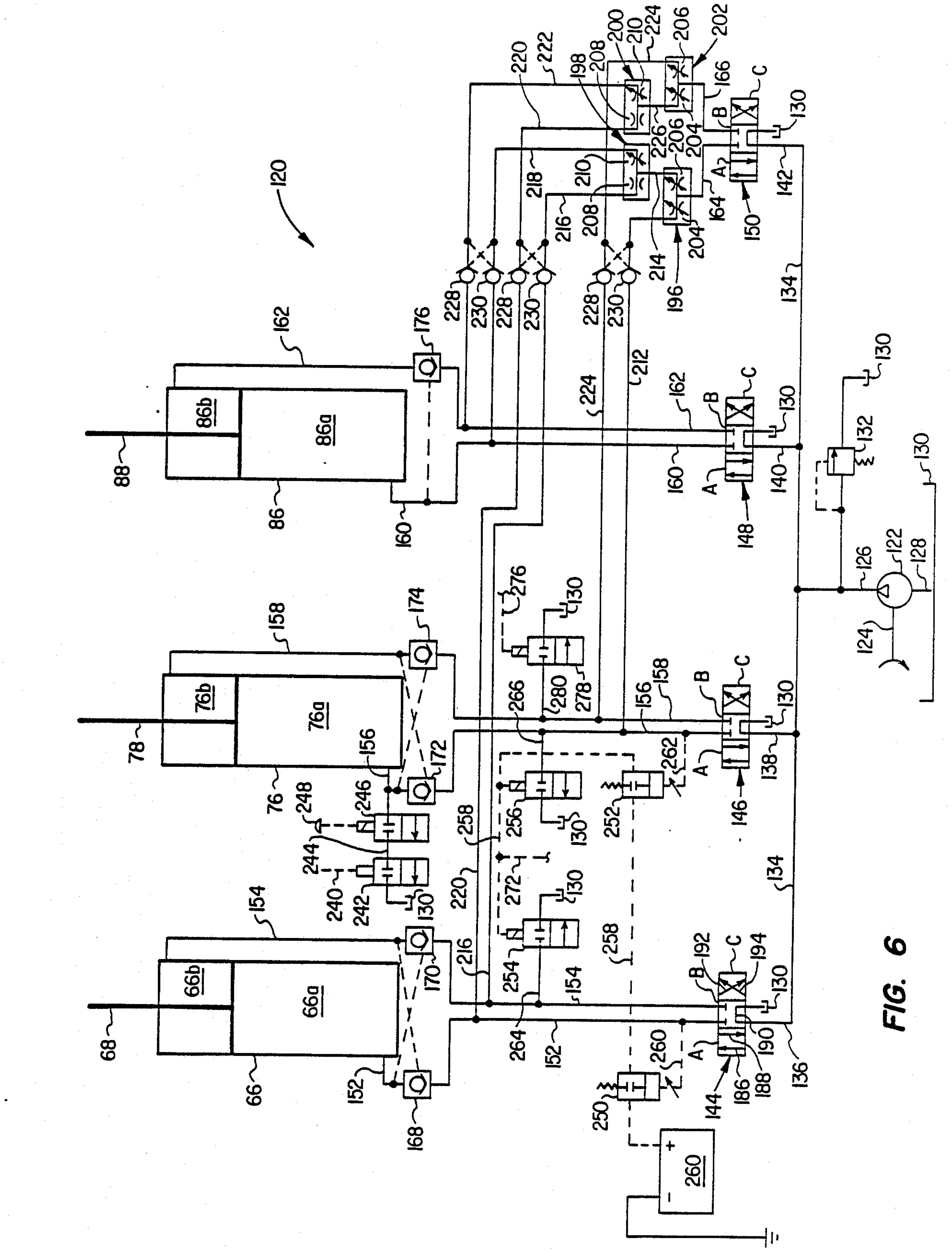
FIG. 6 is a schematic diagram of a hydraulic actuating circuit used to pivotally drive the articulated linkage and fork portions of the forklift.

Referring now to FIG. 6, the actuation circuit 120 includes a fixed displacement hydraulic circulating pump 122 which is rotationally driven by the diesel engine 34 via appropriate mechanical drive means 124, and is operatively interposed in a main hydraulic supply line 126 which has an open inlet end 128 in communication with hydraulic fluid disposed in a main reservoir structure that is identified at various locations on the circuit 120 by the reference numeral 130. A pilot-operated main pressure relief valve 132 is connected to the line 126 downstream from the pump 122 and functions to dump hydraulic fluid from the line 126 into the reservoir 130 upon sensing an excessive pressure in such supply line. Downstream from the pump 122 the supply line 126 is connected to a supply header line 134 to which branch hydraulic supply lines 136, 138, 140 and 142 are in turn connected. Branch supply lines 136, 138, 140 and 142 are respectively connected to the inlet sides of four 3-way series/parallel directional control valves—a gantry control valve 144, a boom control valve 146, a fork control valve 148, and a programming control valve 150. Respectively connected to the outlet sides of the valves 144, 146, 148 and 150 are pairs of hydraulic lines 152 and 154, 156 and 158, 160 and 162, and 164 and 166.

At their upper ends (as viewed in FIG. 6) the lines 152 and 154 are respectively communicated with the base and rod side interior portions $66_a$ and $66_b$ of the gantry actuating cylinders 66 (such cylinders, like the boom and fork cylinders being schematically illustrated in FIG. 6 as a single cylinder and associated actuating rod), and have respectively interposed therein cross-piloted check valves 168 and 170. In a similar fashion, the lines 156 and 158 are respectively communicated at their upper ends with the base and rod side interior portions $76_a$ and $76_b$ of the boom cylinders 76, and have respectively interposed therein cross-piloted check valves 172 and 174. Finally, the lines 160 and 162 are respectively communicated at their upper ends with the base and rod side interior portions $86_a$ and $86_b$ of the fork cylinders 86, the line 162 having operatively interposed therein a cross-piloted check valve 176.

Each of the directional control valves 144, 146, 148 and 150 is of conventional construction and is provided with three operative sections A, B and C which may be shifted into operative position by pivoting an appropriate one of four control levers 178, 180, 182 and 184 (FIG. 2) positioned on the control panel 38 and respectively associated with the valves 144, 146, 148 and 150. Using the gantry valve 144 as an example, typical of the other three valves 146, 148 and 150, section A is provided with a pair of parallel passages 186 and 188 which, with section A shifted into alignment with the lines 152 and 154, communicates the branch supply line 136 with the hydraulic line 152, and communicates the hydraulic line 154 with the hydraulic reservoir 130. Thus, with the gantry valve 144 in its "A" position, hydraulic fluid is forced upwardly through the branch supply line 136, the valve passage 186, the hydraulic line 152, the check valve 168 and into the base sides $66_a$ of the gantry cylinders 66. Entry of hydraulic fluid into these cylinder portions $66_a$ forces the rods 68 outwardly to rearwardly pivot the gantry. Such outward movement of the rods 68 simultaneously forces hydraulic fluid outwardly through the rod side cylinder portions $66_b$, downwardly through the check valve 170, and through the hydraulic line 154 and valve passage 188 into the reservoir 130.

In the "B" position of the valve 144 depicted in FIG. 6, hydraulic fluid flowing upwardly through the branch supply line 136 is returned to the reservoir 130 via a transfer passage 190 within the valve section B, and the hydraulic lines 152, 154 are blocked at their lower ends to prevent flow therethrough, thereby locking the gantry rods 68 against extension or retraction. When section "C" of the valve 144 is manually moved into alignment with the lines 152 and 154, hydraulic fluid forced upwardly through the branch supply line 136 is flowed into the hydraulic line 154 through a diagonally extending passage 192 within the valve section C into the hydraulic line 154, upwardly through the check valve 170 and into the gantry rod side cylinder portions $66_b$ to retract the rods 68 and pivot the gantry in a forward direction. Retraction of the rod 68 in this manner forces hydraulic fluid outwardly from the gantry base side cylinder portions $66_a$, downwardly through the check valve 168 and hydraulic line 152, and into the reservoir 130 through a diagonally extending passage 194 formed in section C of the control valve 144.

In a similar manner, the boom control valve 146 may be manually switched between its positions A, B and C to respectively extend the boom rods 78 to upwardly pivot the boom relative to the gantry, to lock the boom rods 78 in a predetermined position, or to retract the boom rods to downwardly pivot the boom relative to the gantry.

The lifting forks are similarly controlled utilizing the fork control valve 148, shifting of the valve 148 between its positions A, B and C respectively extending the fork rods 88 to downwardly tilt the forks, lock the forks in a predetermined pivotal position relative to the outer ends of the boom arms, and retract the rods 88 to upwardly tilt the forks.

It can be seen from the foregoing that the control valves 144, 146 and 148, together with their associated circuitry portion of the actuation circuit 120, comprise a "manual" portion of the circuit 120 which may be utilized to selectively and independently pivot the gantry forwardly or rearwardly relative to the forklift frame, pivot the boom upwardly or downwardly relative to the gantry, and upwardly or downwardly tilt the lifting forks relative to the boom.

The actuation circuit 120 is also uniquely provided with an "automatic" or "programmed" operating portion which, by utilizing the control valve 150 with the valves 144, 146 and 148 in their "B" positions, may be utilized to drive the articulated linkage 42 between its fully retracted and lowered position (FIG. 4) and its fully raised and extended position (FIG. 5) while automatically maintaining the lifting forks 64 in a predetermined pivotal orientation relative to the ground 26. This advantageously permits the articulated linkage to be conveniently and easily moved between its two limit positions, using only the control valve 150, without such linkage movement causing the forks to tilt downwardly and dump a load supported thereon. Accordingly, once a pallet is supported on the lifting forks with, for example, the forks being slightly rearwardly tilted, the programmed portion of the actuation circuit 20 maintains the forks in this safe orientation regardless of what position the articulated linkage is moved from or toward.

In addition to the control valve 150, the programmed portion of the actuation circuit 120 includes four hydraulic flow dividers 196, 198, 200 and 202, each of which functions to receive a single inlet flow of hydraulic fluid and divide the inlet flow into two outlet flows having a predetermined and adjustable flow rate ratio. Operated in a reverse flow direction, the flow dividers receive and internally combine two hydraulic fluid flows, maintain a predetermined flow rate ratio therebetween, and discharge the two flows as a single hydraulic fluid flow.

As illustrated in FIG. 6, the flow dividers 196 and 202 are each provided with a pair of manually adjustable flow restriction orifices 204 and 206, while each of the flow dividers 198 and 200 is provided with a fixed internal flow restriction orifice 208 and a manually adjustable internal flow restriction orifice 210.

With the manual control valves 144, 146 and 148 in their locked "B" positions, the "programmed" mode of the actuation circuit 20 is operated in the following manner. To move the articulated linkage 42 to its fully raised and forwardly extended position, the control valve 150 is shifted to its "A" position so that hydraulic fluid is forced upwardly through the branch supply line 142, through the passage 186 in valve 150 and through the line 164 into the flow divider 196. The internal orifices 204 and 206 and the divider 196 divide the incoming flow of hydraulic fluid into a first outlet flow which is forced into the boom supply line 156 via a branch line 212 to upwardly pivot the boom relative to the gantry, while the balance of the hydraulic flow entering the divider 196 is transferred to the flow divider 198 via an outlet line 214. Hydraulic fluid transferred to the flow divider 198 through the line 214 is divided by the orifices 208 and 210 in divider 198 into two proportioned outlet flows which are respectively forced into the gantry supply line 154 and the fork supply line 160 through conduits 216 and 218 to forwardly pivot the gantry and downwardly pivot the lifting forks.

Thus, with the control valve 150 in its "A" position, a forward pivoting of the gantry, upward pivoting of the boom, and downward tilting of the lifting forks is achieved. Importantly, by appropriately adjusting the variable orifices 204, 206 and 210 in the flow dividers 196 and 198, these three simultaneous pivotal motions may be synchronized in a manner such that as the gantry and boom are being moved toward the fully raised and forwardly extended position of the articulated linkage, the simultaneous downward tilting of the forks maintains the forks in a predetermined, fixed pivotal position relative to the ground. Accordingly, with the forks initially set (i.e., by first utilizing the manual control valve 148) the program control valve 150 may be utilized to simultaneously raise and forwardly extend the forks without causing them to tilt forwardly or rearwardly and undesirably tilt the load carried thereby.

During this movement of the articulated linkage toward its fully raised and forwardly extended position, hydraulic fluid discharged from the gantry and fork cylinder portions $66_a$ and $86_b$ is respectively returned to the flow divider 200 through hydraulic lines 220 and 222 interconnected between the lines 152, 162 and the orifices 208, 210 of the flow divider 200. In a similar fashion, hydraulic fluid discharged from the boom cylinder portions $76_b$ is returned to the orifice 206 of the flow divider 202 by a hydraulic line 224 interconnected between the boom line 158 nd the orifice 206 of divider 202. Hydraulic fluid entering the orifices 208 and 210 of the divider 200 is flowed through the orifice 204 of the divider 202 through a hydraulic line 226. The hydraulic fluid flowed into the divider 202 through the lines 224, 226 is discharged therefrom through the line 166 and returned to the reservoir 130 through the passage 188 in section A of the control valve 150.

To move the articulated linkage toward its fully retracted and lowered position, the control valve 150 is shifted to its "C" position. With the valve 150 in this position, hydraulic fluid forced upwardly through the branch supply line 142 is flowed upwardly through its passage 194 into the line 166 and into the flow divider 202. The incoming flow to divider 202 is split by the orifices 204, 206 of divider 202, and the orifices 208, 210 of the divider 200 to forced hydraulic fluid into the gantry line 152, the fork line 162, and the boom line 158 through the hydraulic lines 220, 222 and 224, respectively. Appropriate adjustment of the orifices 204, 206 and 210 in the dividers 202 and 200 causes this hydraulic flow to simultaneously rearwardly pivot the gantry and downwardly pivot the boom while rearwardly pivoting the lifting forks in a manner maintaining them in a predetermined, fixed pivotal orientation relative to the ground. Hydraulic fluid discharged from the cylinder portions $66_b$, $76_a$ and $86_a$ is flowed through the dividers 198 and 196, through the line 164, and into the reservoir 130 through the passage 194 of section C of the valve 150. As illustrated in FIG. 6, each of the pairs of hydraulic lines 216 and 220, 212 and 224, and 220 and 222 is provided with a pair of cross-piloted check valves 228 and 230. With the control valve 150 in its "B" position, flow through the hydraulic line pairs 216 and 220, 212 and 224, and 220 and 222 is precluded as previously described.

One of the primary advantages provided by the improved forklift 10 is its ability to quickly, easily and safely unload the palletized articles 16 from the same side of the truck bed 12. More specifically, it is not necessary in the present invention to unload one of the article rows from one side of the truck and then move the forklift to the other side of the truck to remove the other row of articles. Referring to FIGS. 7A–7D, this convenient unloading process will now be described.

Figure 7A:
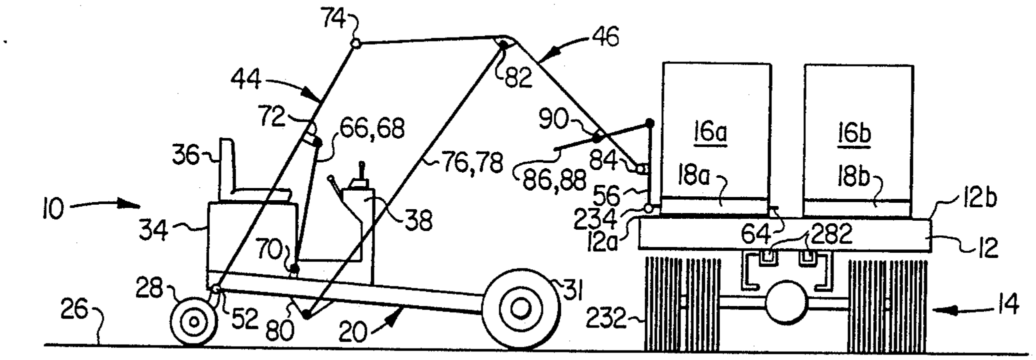
FIGS. 7A through 7D are simplified schematic side elevational views of the forklift and sequentially illustrate its use in unloading "near side" palletized articles from the truck bed.

To unload one of the "near side" articles $16_a$, which is positioned adjacent the near side edge $12_a$ of the truck bed 12, the "manual" mode of the actuation circuit 120 is used to raise the forks 64 to the level of the pallet $18_a$ of the near side article $16_a$ and are extended, in a generally level position, slightly forwardly of the front drive wheels 30 of the forklift. The forklift is then driven forwardly toward the near side edge $12_a$ of the truck bed until the front wheels 30 are adjacent the outer wheel 232 of the truck and the forks 64 are operatively inserted into the pallet $18_a$ (FIG. 7A). Using the manual control valve 148, the forks 64 are then slightly pivoted in a counterclockwise direction to similarly tilt the near side article $16_a$.

Figure 7B:
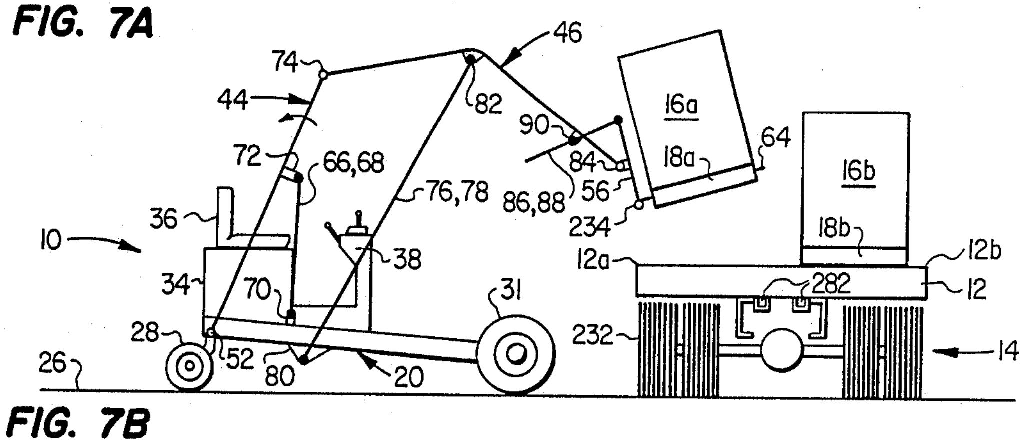

With the forks rearwardly tilted in this manner, the manual control valve 144 is then used to rearwardly pivot the gantry 44, thereby causing the boom 46 to move rearwardly and tilt upwardly in a counterclockwise direction to lift and rearwardly move the near side article $16_a$ relative to the truck bed 12 (FIG. 7B).

Figure 7C:
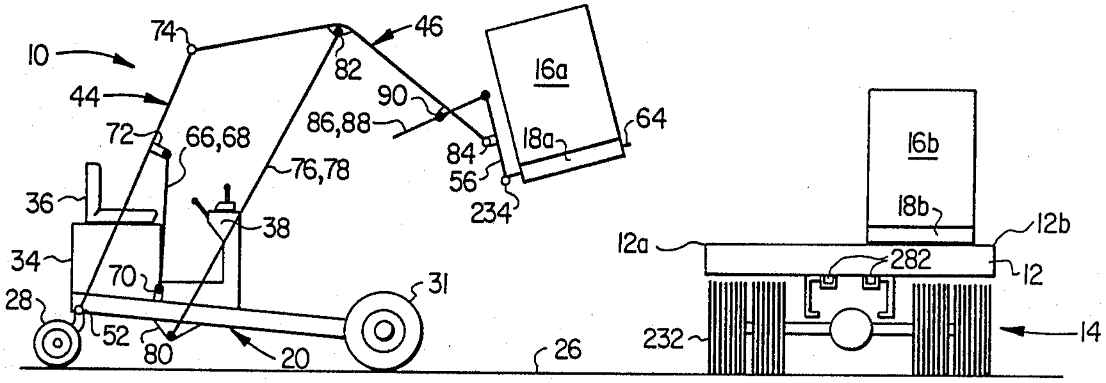
Figure 7D:
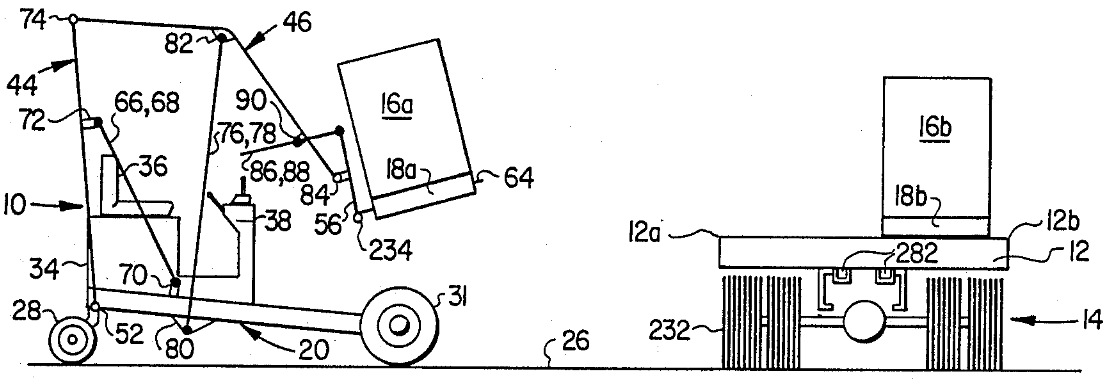

Next, the forklift 10 is backed away from the truck bed 12 as illustrated in FIG. 7C. Then, as illustrated in FIG. 7D, the "programmed" mode of the actuation system 120 (via the control valve 150) is utilized to lower and rearwardly move the article $16_a$ while maintaining the forks 64 in their rearwardly pivoted orientation. The forklift 10 is then driven to an unloading location and the article $16_a$ is fully lowered (again using the programmed acutation mode) to the ground between the frame support arms 24, the forks are pivoted downwardly to their horizontal position, and the forklift is backed away from its lowered load and is then ready to unload the far side article $16_b$.

Figure 8A:
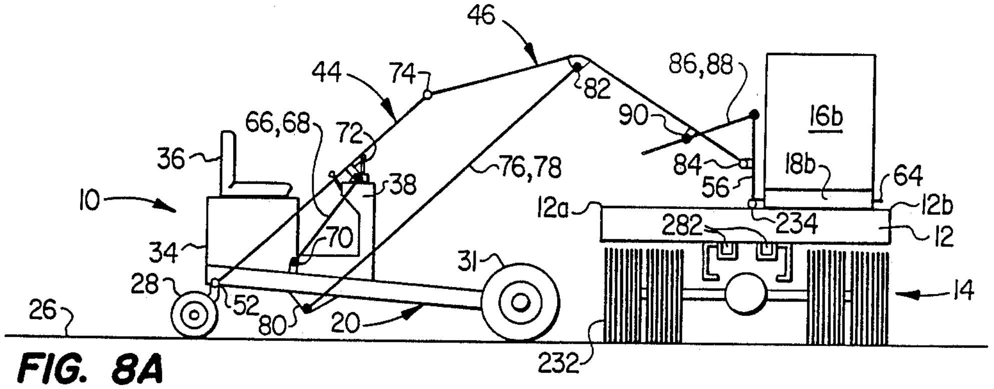
FIGS. 8A through 8D are simplified schematic side elevational views of the forklift and sequentially illustrate its use in unloading "far side" palletized articles from the truck bed.

Using the manual actuation mode again, the forks 64 are raised to the level of the pallet $18_b$ of the "far side" article $16_b$ positioned adjacent the far side edge $12b$ of the truck bed 12, and moved forwardly a distance substantially greater than that described in conjunction with FIG. 7A. The forklift 10 is then driven forwardly toward the near side edge $12_a$ of the truck bed 12 until the forks 60 are moved across the upper surface of the truck bed and inserted into the pallet $18_b$, at which point the front wheels 30 of the forklift are again moved to a position adjacent the outer truck wheel 232 (FIG. 8A).

Figure 8B:
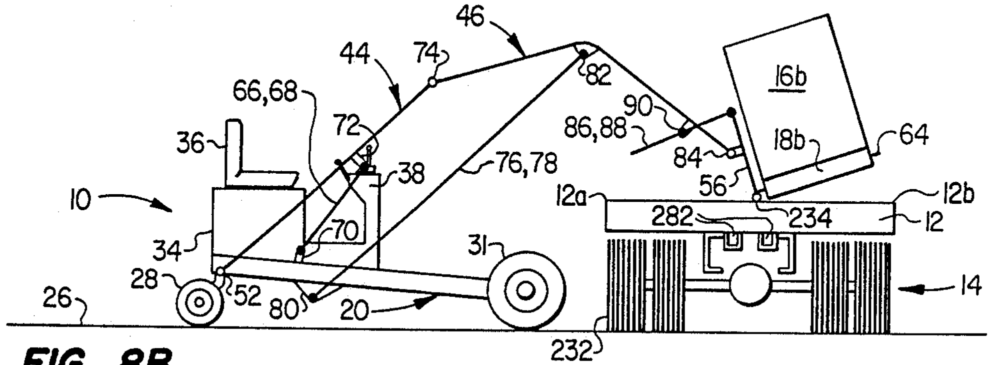

Next, as illustrated in FIG. 8B, the control valve 148 is utilized to pivot the forks 64 in a counterclockwise direction, thereby rearwardly tilting the forks and the article $16_b$ liftingly supported thereby. Such rearward tilting of the forks 64 downwardly moves a roller element 234 (see FIGS. 2 and 4 also), supported between brackets 236 on a lower side portion of the frame support structure 56, into engagement with the upper surface of the truck bed 12. Lowered into engagement with the truck bed 12 in this manner, the roller 234 rollingly supports the weight of the forks 64, an outer end portion of the boom 46, the far side article $16_b$ and its pallet $18_b$.

Lowering of the roller 234 also brings the position sensing portion of a normally open microswitch 238 (FIG. 2), carried by the fork support structure 52, into engagement with the upper surface of the truck bed 12 to thereby close the microswitch. Closure of the microswitch 238 generates an electrical output signal 240 (FIG. 6) which opens a normally closed two position hydraulic valve 242 interposed in a hydraulic line 244 interconnected between the reservoir 130 and the boom hydraulic supply line 156 between the check valve 172 and the boom cylinder portions $76_a$. Connected in series with the valve 242 in the line 244 is a normally closed, two-position hydraulic roll-off dump valve 246 provided with a mechanical actuating knob 248 positioned in a suitable location on the fork lift control panel 38.

With the roller 234 in its "down" position, the operator of the forklift depresses the knob 248 to open the valve 246, thereby communicating the boom cylinder portions $76_a$ with the hydraulic reservoir 130 so that the boom actuating rods 78 exert no appreciable vertical supporting force on the boom. This, in effect, causes the boom to go "limp" so that rearward pivoting of the gantry 44 will simply pull the boom rearwardly without causing it to lift upwardly from the truck bed 12.

Figure 8C:
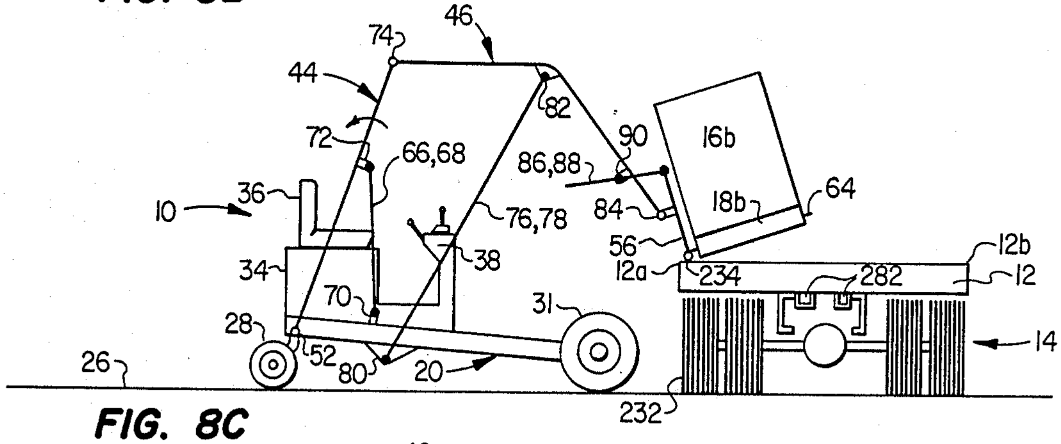

While the roll-off dump valve knob 248 is depressed, the forklift operator then rearwardly pivots the gantry (FIG. 8C) to roll the article $16_b$ leftwardly along the truck bed 12 until the rollers 234 are brought closely adjacent the near side edge $12_a$ of the truck bed. At this point, the rearward pivoting of the boom is terminated. Next, the operator pulls upwardly on the dump valve control knob 248 to close the valve 246 so that the boom actuating rods 78 can once more vertically support the boom 46.

Figure 8D:
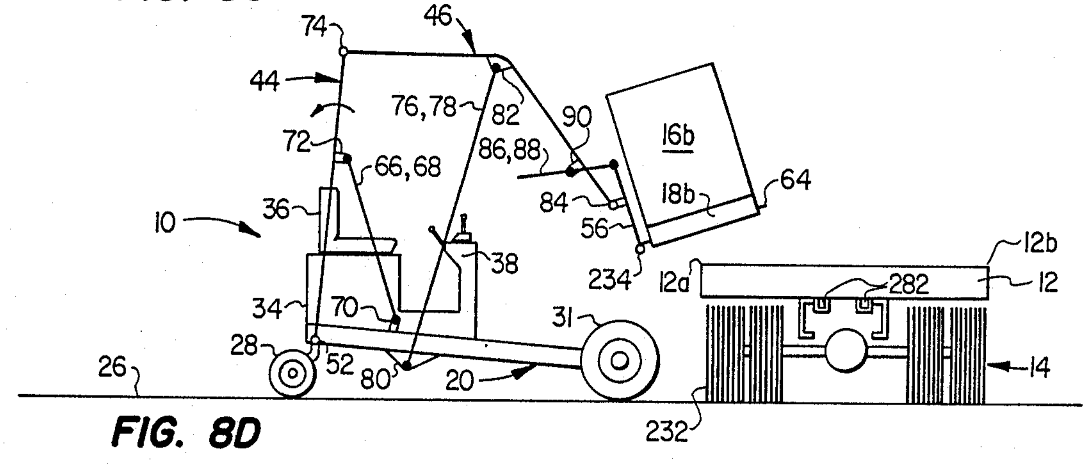

With the dump valve 246 closed again in this manner, the operator rearwardly pivots the gantry 44, using the manual control valve 144, to thereby cause the boom 46 to lift and rearwardly move the far side article $16_b$ supported on the rearwardly tilted forks 64 (FIG. 8D). Finally, the operator then backs the forklift away from the truck and utilizes the programmed mode control valve 150 to lower and rearwardly retract the load so that it can be moved to the unloading site and unloaded.

It can readily be seen that during the "roll-of" portion of this far side article unloading process, the weight of the load is carried entirely by the truck itself. The articulated linkage portion of the forklift thus does not have to lift the load until the load is rolled to the near side edge $12_a$ of the truck bed 12. The forks 64 may thus be moved entirely across the truck bed 12 to operatively engage the far side article without having any appreciable tipping load imposed upon the forklift until the far side article is rolled to adjacent the near side edge $12_a$. Because of this unique aspect of the present invention, the forklift 10 may be conveniently and quickly used to unload all of the articles 16 from a selected single side of the truck bed.

It is important to note that during the "roll-off" portion of the far side unloading process just described, the series connection of the hydraulic valves 242 and 246 (FIG. 6) prevents the load from simply falling to the ground (via its pivoting of the "limp" boom) in the event that the operator inadvertently rolls the load off the near side of the truck bed while holding the roll-off dump valve 248 down. If this sequence of events is mistakenly carried out, once the roller 234 outwardly crosses the near side edge $12_a$ the microswitch 238 opens and immediately closes the hydraulic valve 242 so that the boom rods 78 once again support the boom against pivotal motion in a clockwise direction relative to the gantry.

The improved forklift 10, in addition to these novel far side unloading capabilities, also has a variety of built-in safety features which function to prevent load-caused tipping of the lift. For example, with reference now to FIGS. 6 and 9A–9C, the present invention provides unique anti-tipping means in the form of a load moment safety sensing system incorporated into the actuation system 120 schematically depicted in FIG. 6. This safety sensing system includes a pair of normally open electric pressure switches 250 and 252, and a pair of normally closed, two position, solenoid-actuated hydraulic valves 254 and 256.

Pressure switches 250 and 252 are connected in series in an electric supply line 258 interconnected between suitable battery means 260 and the solenoid portions of the hydraulic valves 254 and 256. The normally closed pressure switches 250 and 252 are respectively connected to the gantry hydraulic line 152 and the boom hydraulic line 156 by pressure sensing lines 260 and 262. When the hydraulic pressure in line 152 is at or above a predetermined level thereof, the sensed pressure in line 260 closes the pressure switch 250. In a similar manner, when the hydraulic pressure within the line 156 is at or above a predetermined level thereof, the sensed pressure in line 262 functions to close the pressure switch 252.

The normally closed hydraulic valve 254 is interposed in a nulling line 264 interconnected between the gantry hydraulic line 154 and the hydraulic reservoir 130. In a similar manner, the normally closed hydraulic valve 256 is interposed in a nulling line 266 interconnected between the boom hydraulic line 156 and the hydraulic reservoir 130.

It can be seen that when the hydraulic pressures within each of the hydraulic supply lines 152 and 156 is at or above its predetermined level, both of the pressure switches 250 and 252 are closed, thereby energizing the solenoid portions of the hydraulic valves 254 and 256 to open these valves and rapidly dump hydraulic fluid from the gantry and boom internal cylinder portions $66_b$ and $76_a$ into the reservoir 130. In turn, this "nulling" of the rod side of the gantry cylinders 66, and the base side of the boom cylinders 76, prevents the gantry rods 68 from being further retracted, and also prevents the boom rods 78 from being further extended. It will also be noted that, for this nulling to be initiated, it is necessary for both of the pressure switches 250, 252 to be brought to their closed position—a condition brought about only when the sensed hydraulic pressure in each of the hydraulic lines 152 and 156 is at or above a predetermined level thereof. If the hydraulic pressure in either of these lines is below its predetermined level, this nulling does not occur.

Figure 9C:
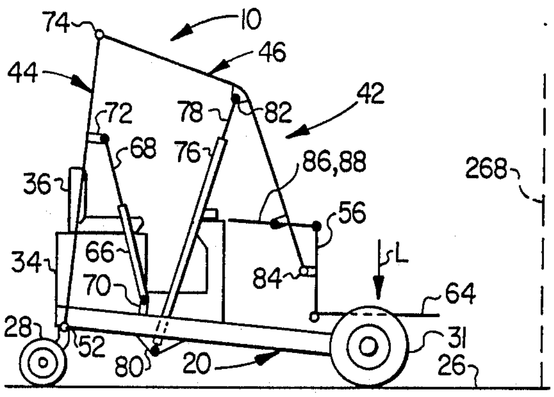
Figure 9C:
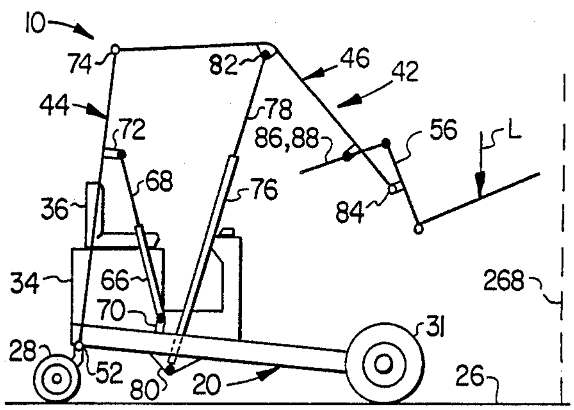
Figure 9C:
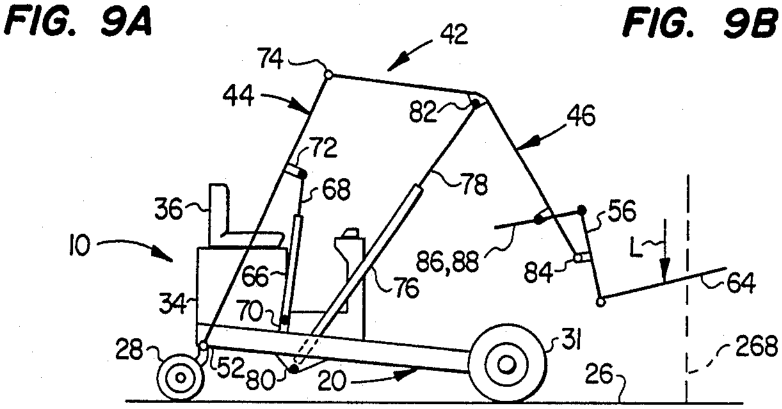

The operation and usefulness of this anti-tipping system may be more easily understood from a practical standpoint with reference to FIGS. 9A–9C which depict the articulated linkage portion 42 of the forklift 10 in various representative positions, with a load L being carried on the lifting forks 64. In FIG. 9A, the loaded forklift 10 is in a representative stable position in which the load L is positioned in the "safe" zone in back of an imaginary plane 268 positioned forwardly of the front drive wheels 30 and 31. In this stable position, the clockwise load moment about the wheels 30, 31 is less than the resistive counterclockwise moment about such wheels caused by the weight of the forklift 10. The distance between the wheels 30, 31 and the imaginary plane 268 will, of course, vary depending on the magnitude of the load L. In the representative stable forklift position illustrated in FIG. 9A, it will be assumed that the hydraulic pressures in the gantry and boom lines 152 and 156 are each below their set point levels so that both of the pressure switches 250 and 252 (FIG. 6) are in their open position so that both of the nulling valves 254 and 256 remain closed. The sensed hydraulic pressures in the gantry and boom lines 152 and 156 are dependent upon the pressures in the gantry and boom base side cylinder portions $66_a$ and $76_a$ which are in turn dependent upon the inwardly directed forces on the gantry rods 68 and the boom rods 78 which support the articulated linkage 42 in its position illustrated in FIG. 9A.

If the boom rods 78 are then extended (using the "manual" portion of the actuation circuit 120) to upwardly pivot the boom 46 relative to the gantry 44 as depicted in FIG. 9B, it can be seen that the forks 64 and the load L are moved upwardly and forwardly toward the safety plane 268, thereby lessening the tipping stability of the forklift 10. However, because the load L is still to the left of the plane 268, the forklift 10, from a tipping standpoint, is still in a stable position. It can also be seen that due to this upward pivoting of the boom 46 (with the gantry 44 left in its previous position as depicted in FIG. 9A), the inwardly directed linkage support forces on the gantry rods 68 and the boom rods 78 have been increased. For purposes of analysis, it will be assumed that this upward pivoting of the boom 46 has increased the hydraulic pressure in the boom line 156 to a level above its set point, but that the hydraulic pressure in the gantry line 152, though increased, has not yet reached its set point level. Under these conditions, the pressure switch 252 has been closed, but the pressure switch 250 remains open so that no control signal is sent to the nulling valves 254, 256 from the battery means 260. Accordingly, these nulling valves remain in their closed positions.

In FIG. 9C, the articulated linkage portion 42 of the forklift 10 has been moved to an even more unstable position by retracting the gantry cylinders 68 to forwardly pivot the gantry 44, thereby forwardly moving and downwardly tilting the boom 46 to move the load L even closer to the plane 268 (but still in the "safe" zone to the left of plane 268). This movement of the articulated linkage 42 increases the inwardly directed reactive forces on the gantry rods 68 to thereby increase the hydraulic pressure in the gantry line 152 to a level above its sets point. In turn, this closes the pressure switch 250. With both of the pressure switches 250, 252 now closed, an electrical actuation signal is transmitted to the solenoid portions of the nulling valves 254, 256 via the line 258 to open the valves 254, 256 and rapidly dump hydraulic fluid to the reservoir 130 from the gantry line 154, the boom line 156, the rod sides $66_b$ of the gantry cylinders 66, and the base sides $76_a$ of the boom cylinders 76. The dumping of hydraulic fluid from these portions of the actuation circuit 120 prevents the articulated linkage 42 from being hydraulically driven toward a more unstable position.

Specifically, such fluid dumping prevents further retraction of the gantry rods 68 to forwardly pivot the gantry 44, and prevents a further extension of the boom rods 78 to pivot the boom 46 upwardly beyond its position depicted in FIG. 9C. Accordingly, the load L cannot be moved further toward the plane 268 and the forklift 10 is prevented from forwardly tipping about its front drive wheels 30 and 31. This nulling of the hydraulic lines 154 and 156 prevents any of the control valves 144, 146 and 150 from being utilized in a manner moving the articulated linkage to a less stable position.

It can also be seen that the nulling of the hydraulic lines 154 and 156 functions to remove the cross-piloting pressures on the check valves 168, 170, 172 and 174 so that such check valves then function to hold the gantry rods 68 and the boom rods 78 in the positions indicated in FIG. 9C.

The anti-tipping system just described can advantageously come into play in several situations encountered while utilizing the forklift 10. For example, when a palletized article has been lifted from the truck bed 12 as illustrated in FIG. 7C, and the "programmed" mode of the actuation system is to be utilized to lower and retract the article to the position illustrated in FIG. 7D, the anti-tipping system just described prevents the operator from inadvertently using either the programmed mode or one of the manual control valves to shift the load in an opposite direction to cause the forklift to tip. Additionally, while the forklift 10 is particularly well suited to unloading articles from an elevated surface such as the truck bed 12, it will readily be appreciated that it could also be used to load articles on such elevated surface. During a loading movement of the forks 64, in which the forks were being lifted and moved forwardly with a load thereon, the anti-tipping system would similarly prevent the load from being forwardly extended to a position which would cause tipping of the forklift.

The anti-tipping system of the present invention also uniquely functions to prevent rearward movement of the forklift 10 away from the truck bed 12 (as illustrated in FIG. 7C) in the event that the article $16_a$ being lifted from the truck bed (as in FIG. 7B) is heavy enough, or is positioned sufficiently forwardly of the drive wheels 30, to tip the forklift over if it were moved rearwardly away from the truck bed. This important safety feature is provided by means of a solenoid-actuated pin 270 (FIG. 3) positioned on the control panel 38. When each of the pressure switches 250, 252 is closed, the actuating signal sent to the nulling valves 254, 256 is also transmitted to the solenoid acutuating portion of the pin 270 via an electrical line 272 connected as illustrated in FIG. 6 to the electrical line 258. The signal received via the line 272 extends the pin 270 outwardly behind the T-handle 112 to prevent it from being pivoted rearwardly to back the forklift away from the truck bed 12. Accordingly, if during the initial lifting of the palletized article from the truck bed (i.e., as illustrated in FIG. 7B), an imminent tipping condition is sensed, the resulting extension of the pin 270 prevents the forklift from being backed away from the truck bed as illustrated in FIG. 7C.

Another safety feature incorporated into the actuating system 120 is a proximity sensor switch 274 (FIG. 4) mounted on the underside of one of the boom arms 54 adjacent its outer end. The sensor 274 limits the movement of the boom 46 toward the inner base portion 55 of the front section of the frame 20 when the articulated linkage is near its fully lowered and retracted position depicted in FIG. 4. Specifically, when the sensor 274 is brought into engagement with the frame portion 25, it generates an electrical output signal through a line 276 to a solenoid actuated nulling valve 278 (FIG. 6) interposed in a hydraulic line 280 interconnected between the hydraulic boom line 158 in 25 the hydraulic reservoir 130. Accordingly, as soon as the sensor 274 is brought into engagement with the frame portion 25, the resultant nulling of the hydraulic boom line 158 precludes further clockwise pivoting of the boom relative to the gantry 44 to prevent damage to the frame portion 25 or other components of the forklift 10.

Figure 10C:
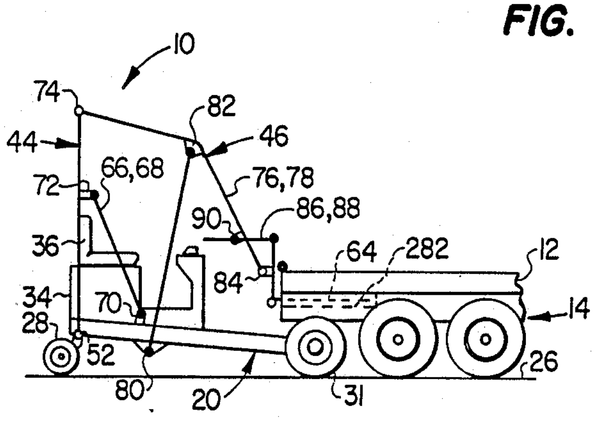
Figure 10C:
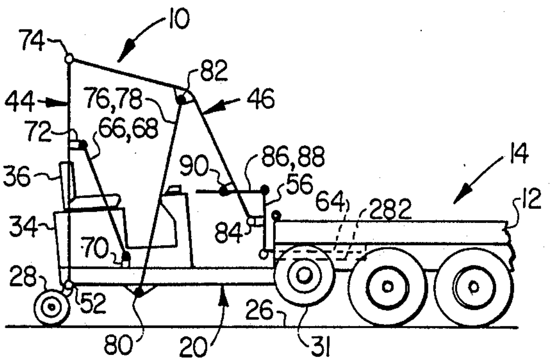
Figure 10C:
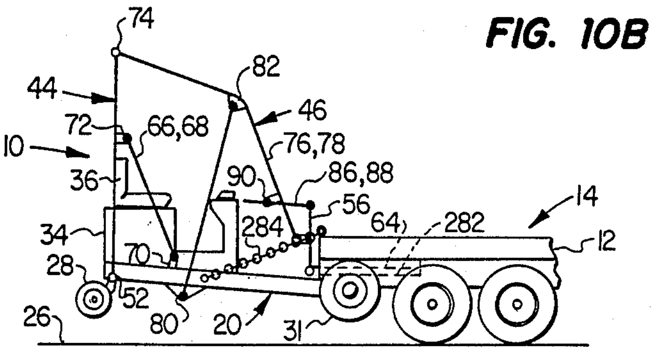

Referring now to FIGS. 10A–10C, after the articles 16 have been unloaded from the truck bed 12, the forklift 10 is mounted again on the back end of the truck, in piggyback fashion as depicted in FIG. 1, in the following manner. Using the previously described manual controls, the forks 64 are horizontally positioned generally over the front drive wheels 30 of the forklift and are raised to the level of support channels 282 secured to the underside of the truck bed 12 adjacent its back end. As illustrated in FIG. 10A, the forklift 10 is then driven forwardly until the forks 64 enter the channels 282 and the front forklift wheels 30 are positioned under the channels 282. The boom 46 is then pivoted downwardly to raise the front drive wheels 30 into engagement with the underside of the truck bed as illustrated in FIG. 10B. Next, the gantry 44 is rearwardly pivoted as illustrated in FIG. 10C to raise the rear caster wheels 28 off the ground 26. Finally, a pair of safety chains 284 are interconnected between the back end of the truck bed 12 and opposite sides of the forklift frame 20 to resecure the forklift 10 to the truck for transport therewith.

To subsequently unload the forklift from the rear end of the truck, the loading steps are simply reversed. Specifically, the chains 284 are removed, the gantry 44 is forwardly pivoted to lower the rear caster wheels 28 to the ground, and the boom 46 is then upwardly pivoted to lower the front drive wheels 30 to the ground. The forklift is then backed away from truck to remove the forks 64 from the support channels 282 to ready the forklift for its next article-unloading task.

From the foregoing it can be seen that the improved forklift 10 of the present invention provides a variety of operational and safety advantages over conventional forklift devices used to load or unload articles from elevated surface areas. The ability of the forklift 10 to reach a substantial distance across such elevated surface, operatively engage a heavy article and then roll the article across the surface before lifting the article therefrom permits the removal of all palletized articles from a truck bed from either side of the truck, thereby substantially reducing the time, and thus the cost, required to unload the truck. The unique anti-tipping system described above permits the forklift 10 to be used in an extremely safe manner despite its considerable outreach capabilities. Moreover, as can be seen from the foregoing description, the improved forklift of the present invention utilizes conventional hydraulic components so that it may be easily fabricated and serviced. The other structural components of the forklife are of simple yet rugged construction and also may be easily fabricated and serviced.

The foregoing detailed description is to be clearly understood as being given by way of illustration and example only, the spirit and scope of the present invention being limited solely by the appended claims.

What is claimed is:

1. Improved forklift apparatus for unloading articles from an elevated surface having an outer edge portion, said apparatus comprising:

a frame;

frame support means for movably supporting said frame on a support surface lower than said elevated surface;

drive means for propelling said frame along said support surface;

fork means for liftingly engaging an article resting on said elevated surface a substantial distance inwardly from said outer edge portion thereof;

linkage means, carried by said frame for movement therewith, for interconnecting said frame and said fork means, said linkage means being extendable and retractable in horizontal and vertical directions;

actuating means for operating said linkage means to cause selected horizontal and vertical movement of said fork means in a manner such that said fork means may be moved upwardly to a level above that of said elevated surface, moved inwardly across said outer edge portion and into lifting engagement with the article, moved toward said outer edge portion and said frame while supporting the article, and then moved away and lowered from said elevated surface to remove the article therefrom; and load support means, associated with said linkage means for movement therewith, for rollingly engaging said elevated surface and utilizing it to support the weight of the article carried by said fork means as said fork means are moved toward said outer edge portion and said frame to thereby reduce the tipping load moment on said apparatus when said linkage means are in a horizontally extended position during loading of the article, said linkage means including a first section pivotally connected to said frame, a second section having an inner end portion pivotally connected to said first section, and an outer end portion, said fork means including a fork support structure pivotally connected to said outer end portion of said second section, and a pair of lifting forks operatively secured to said fork support structure, said actuating means including hydraulic cylinder and actuating rod means drivable to pivot said first section relative to said frame, said second section relative to said first section, and said fork support structure relative to said second section, and hydraulic circuit means operable to drive said hydraulic cylinder and actuating rod means, said load support means including roller means carried by said fork support structure for pivotal movement therewith relative to said second section between a first position in which said roller means are lower than said lifting forks and can rollingly engage said elevated surface to thereby rollingly support the weight of an article carried by said lifting forks, and a second position in which said roller means are higher than said lifting forks, and said hydraulic circuit means including dump valve means selectively operable to deactivate a portion of said hydraulic cylinder and actuating rod means in a manner removing vertical supporting force thereof from said second section as said fork means are rolled toward said outer edge portion and said frame.

2. The apparatus of claim 1 wherein:

said apparatus further comprises override means for overriding said dump valve means, and restoring the vertical supporting force of said portion of said hydraulic cylinder and actuating rod means to said second section in response to disengagement of said roller means from said elevated surface.

3. The apparatus of claim 2 wherein:

said portion of said hydraulic cylinder and actuating rod means have an internal cylinder portion adapted to receive pressurized hydraulic fluid from said hydraulic circuit means, said dump valve means communicate with said internal cylinder portion and are selectively operable to dump hydraulic fluid therefrom, and said override means include safety valve means connected in series with said dump valve means, and sensing means for sensing disengagement of said roller means from said elevated surface and responsively closing said safety valve means to prevent hydraulic fluid outflow through said dump valve means.

4. The apparatus of claim 1 further comprising:

proximity sensing means carried by said second section for preventing said second section from being brought into engagement with said frame.

5. Apparatus for unloading articles from an elevated surface, comprising:

a frame;

frame support means for movably supporting said frame on a support surface lower than said elevated surface;

drive means for propelling said frame along said support surface;

article-engaging means for liftingly engaging an article resting on said elevated surface and to be removed and lowered therefrom;

linkage means, carried by said frame for movement therewith, for interconnecting said frame and said article-engaging means, said linkage means being extendable and retractable in horizontal and vertical directions;

actuating means for moving said linkage means relative to said frame to permit said article-engaging means to be brought into lifting engagement with the article, and then move said article-engaging means to remove and lower the article from said elevated surface; and anti-tipping means for preventing load-caused tipping of said apparatus by sensing a tipping load moment imposed on said apparatus by an article carried by said article-engaging means, said tipping load moment being less than that required to tip said apparatus, and responsively preventing said actuating means from moving said linkage means in a manner substantially increasing said tipping load moment, said anti-tipping means including anti-reverse means for automatically preventing said apparatus from being backed away from said elevated surface when the sensed tipping load moment on said apparatus is at or above a predetermined level.

6. The apparatus of claim 5 wherein:

said linkage means include a first section pivotally connected to said frame, and a second section pivotally inter-connected between said first section and said article-engaging means, said actuating means include first force-exerting means for exerting a selectively reversable force on said first section to pivot it in a selected direction relative to said frame, and second force-exerting means for exerting a selectively reversable force on said second section to pivot it in a selected direction relative to said first section, and said anti-tipping means include sensing means for sensing a first force exerted on said first section by said first force-exerting means, and for sensing a second force exerted on said second section by said second force-exerting means, and force limiting means, responsive to the sensed levels of said first and second forces, for preventing said actuating means from causing appreciable increases in said first and second forces when each is at or above a predetermined magnitude thereof.

7. The apparatus of claim 6 wherein:

said first force-exerting means include first hydraulic cylinder and actuating rod means pivotally interconnected between said frame and said first section and having first and second internal cylinder chamber portions adapted to receive hydraulic fluid from a source thereof, said second force-exerting means include second hydraulic cylinder and actuating rod means pivotally interconnected between said frame and said second section and having first and second internal cylinder chamber portions adapted to receive hydraulic fluid from a source thereof, said sensing means are operative to sense an internal cylinder chamber portion pressure in each of said first and second hydraulic cylinder and actuating rod means and responsively generate a control signal when each of the sensed pressures is at or above a predetermined level thereof, and said force limiting means include dumping means for receiving said control signal and responsively dumping hydraulic fluid from said first and second hydraulic cylinder and actuating rod means.

8. The apparatus of claim 7 wherein:

said first hydraulic cylinder and actuating rod means have a rod portion connected to said first section, and a cylinder portion connected to said frame, said second hydraulic cylinder and actuating rod means have a rod portion connected to said second section, and a cylinder portion connected to said frame, said actuating mean further include first and second hydraulic lines respectively communicating with said first and second internal cylinder chamber portions of said first hydraulic cylinder and actuating rod means, and third and fourth hydraulic lines respectively communicating with said first and second internal cylinder chamber portions of said second hydraulic cylinder and actuating rod means, said sensing means include first and second normally open pressure switch means for respectively sensing the fluid pressures within said first and third hydraulic lines, said first and second pressure switch means being closable when the fluid pressure which it senses is at or above a predetermined level, and said dumping means include first and second solenoid-actuated, normally closed hydraulic nulling valves respectively communicating with said second and third hydraulic lines, the solenoid portions of said first and second nulling valves being operatively connected to said electrical line.

9. The apparatus of claim 5 wherein:

said drive means include hydraulic drive circuit means operable by a control member movable in a first direction to back said apparatus away from said elevated surface, and said anti-reverse means include blocking means for blocking movement of said control member in said first direction when said sensed tipping load moment is at or above said predetermined level thereof.

10. A forklift device for unloading articles from an elevated surface, comprising:

a frame;

frame support means for movably supporting said frame on a support surface lower than said elevated surface;

drive means for propelling said frame along said support surface;

fork means for liftingly engaging an article resting on said elevated surface;

articulated linkage means, carried by said frame for movement therewith, for interconnecting said frame and said fork means, said articulated linkage means being movable relative to said frame between a first, fully raised and extended position and a second, fully lowered and retracted position and including a gantry structure pivotally connected to said frame, and a boom structure pivotally interconnected between said gantry structure and said fork means; and actuating means for selectively and independently pivoting said gantry structure relative to said frame, said boom structure relative to said gantry structure, and said fork means relative to said boom structure, to horizontally, vertically and pivotally position said fork means so that the same may be lifted to a level above that of said elevated surface, moved toward and into lifting engagement with the article, and lifted and lowered from said elevated surface to remove the article therefrom, said actuating means being further operable to simultaneously pivot said gantry structure relative to said frame, said boom structure relative to said gantry structure, and said fork means relative to said boom structure, to selectively move said articulated linkage means between said first and second positions thereof while automatically maintaining said fork means in a predetermined, fixed pivotal orientation relative to said support surface, said, actuating means including:

first hydraulic cylinder and actuating rod means interconnected between said frame and said gantry structure and being drivable to cause pivotal motion of said gantry structure in a selected direction relative to said frame, second hydraulic cylinder and actuating rod means interconnected between said frame and said boom structure and being drivable to cause pivotal motion of said boom structure in a selected direction relative to said gantry structure, third hydraulic cylinder and actuating rod means interconnected between said boom structure and said fork means and being drivable to cause pivotal motion of said fork means in a selected direction relative to said boom structure, and hydraulic actuation circuit means for flowing hydraulic fluid from a source thereof through said first, second and third hydraulic cylinder and actuating rod means to operatively drive the same, said hydraulic actuation circuit means including:

a first circuit portion independently operable to flow hydraulic fluid through said first hydraulic cylinder and actuating rod means, a second circuit portion independently operable to flow hydraulic fluid through said second hydraulic cylinder and actuating rod means, a third circuit portion independently operable to flow hydraulic fluid through said third hydraulic cylinder and actuating rod means, and a fourth circuit portion independently operable to simultaneously flow selectively proportioned amounts of hydraulic fluid through said first, second and third hydraulic cylinder and actuating rod means to synchronize in a predetermined manner the pivotal motions of said gantry structure, said boom structure and said fork means during the resultant movement of said articulated linkage means, said first circuit portion including a first pair of hydraulic lines operatively connected to said first hydraulic cylinder and actuating rod means, and first three-position direction control valve means operable to control the flow of hydraulic fluid through said first pair of hydraulic lines, said second circuit portion including a second pair of hydraulic lines operatively connected to said second hydraulic cylinder and actuating rod means, and second three-position directional control valve means operative to control the flow of hydraulic fluid through said second pair of hydraulic lines, said third circuit portion including a third pair of hydraulic lines operatively connected to said third hydraulic cylinder and actuating rod means, and third three-position directional control valve means operable to control the flow of hydraulic fluid through said third pair of hydraulic lines, and said fourth circuit portion including fourth, fifth and sixth pairs of hydraulic lines operatively communicated with said first, second and third hydraulic cylinder and actuating rod means, respectively, a seventh pair of hydraulic lines for flowing hydraulic fluid through said fourth, fifth and sixth pairs of hydraulic lines, fourth three-position directional control valve means for controlling the flow of hydraulic fluid through said seventh pair of hydraulic lines, and adjustable flow dividing means, interconnected between said seventh pair of hydraulic lines and said fourth, fifth and sixth pairs of hydraulic lines, for adjustably regulating the relative hydraulic fluid flow rates through said fourth, fifth and sixth pairs of hydraulic lines.

11. A forklift device positionable on a support surface adjacent an elevated surface and adapted to reach above and a substantial distance across said elevated surface, liftingly engage an article resting thereon, and remove and lower the article from said elevated surface, said forklift device comprising:

a frame;

frame support means for movably supporting said frame on said support surface;

drive means for propelling said frame along said support surface;

fork means for liftingly engaging the article;

articulated linkage means, carried by said frame for movement therewith, for interconnecting said frame and said fork means, said articulated linkage means being movable relative to said frame between a first, fully raised and extended position and a second, fully lowered and retracted position and including a gantry structure pivotally connected to said frame and having an outer end portion, and an elongated boom structure having an inner end pivotally connected to said gantry structure and an outer end pivotally connected to said fork means;

actuating means operable to control the movement of said articulated linkage means and said fork means, said actuating means including:

first hydraulic cylinder and actuating rod means interconnected between said frame and said gantry section and having first and second internal cylinder portions for receiving hydraulic fluid to cause pivotal motion of said gantry structure in a selected direction relative to said frame, second hydraulic cylinder and actuating rod means interconnected between said frame and a longitudinally intermediate portion of said boom section and having first and second internal cylinder portions for receiving hydraulic fluid to cause pivotal motion of said boom structure in a selected direction relative to said gantry structure, third hydraulic cylinder and actuating rod means interconnected between said boom structure and said fork means and having first and second internal cylinder portions for receiving hydraulic fluid to cause pivotal motion of said fork means in a selected direction relative to said boom structure, and hydraulic circuit means for supplying hydraulic fluid from a source thereof to said first and second internal cylinder portions of said first, second and third hydraulic cylinder and actuating rod means;

control means operative to control hydraulic fluid flow through said hydraulic circuit means to said first and second internal cylinder portions of said first, second and third hydraulic cylinder and actuating rod means to selectively and independently cause pivotal motion in a selected direction of said gantry structure relative to said frame, said boom structure relative to said gantry structure, and said fork means relative to said boom structure;

anti-tipping means for preventing load-causing tipping of said device by sensing a tipping load moment imposed on said device by an article carried by said fork means, said tipping load moment being less than that required to tip said device, and responsively preventing said actuating means from moving said articulated linkage means in a manner substantially increasing said tipping load moment; and anti-reverse means for preventing said drive means from being utilized to back said device away from said elevated surface when the sensed tipping load moment is at or above a predetermined level.

12. The forklift device of claim 11 wherein:

said control means are further operative to simultaneously pivot said gantry structure relative to said frame, said boom structure relative to said gantry structure, and said fork means relative to said boom structure, to selectively move said articulated linkage means between said first and second positions thereof while automatically maintaining said fork means in a predetermined, fixed pivotal orientation relative to said support surface.

13. A forklift device positionable on a support surface adjacent an elevated surface and adapted to reach above and a substantial distance across said elevated surface, liftingly engage an article resting thereon, and remove and lower the article from said elevated surface, said forklift device comprising:

a frame;

frame support means for movably supporting said frame on said support surface;

drive means for propelling said frame along said support surface;

fork means for liftingly engaging the article;

articulated linkage means, carried by said frame for movement therewith, for interconnecting said frame and said fork means, said articulated linkage means being movable relative to said frame between a first, fully raised and extended position and a second, fully lowered and retracted position and including a gantry structure pivotally connected to said frame and having an outer end portion, and an elongated boom structure having an inner end pivotally connected to said gantry structure and an outer end pivotally connected to said fork means;

actuating means operable to control the movement of said articulated linkage means and said fork means, said actuating means including:

first hydraulic cylinder and actuating rod means interconnected between said frame and said gantry section and having first and second internal cylinder portions for receiving hydraulic fluid to cause pivotal motion of said gantry structure in a selected direction relative to said frame, second hydraulic cylinder and actuating rod means interconnected between said frame and a longitudinally intermediate portion of said boom section and having first and second internal cylinder portions for receiving hydraulic fluid to cause pivotal motion of said boom structure in a selected direction relative to said gantry structure, third hydraulic cylinder and actuating rod means interconnected between said boom structure and said fork means and having first and second internal cylinder portions for receiving hydraulic fluid to cause pivotal motion of said fork means in a selected direction relative to said boom structure, hydraulic circuit means for supplying hydraulic fluid from a source thereof to said first and second internal cylinder portions of said first, second and third hydraulic cylinder and actuating rod means;

control means operative to control hydraulic fluid flow through said hydraulic circuit means to said first and second internal cylinder portions of said first, second and third hydraulic cylinder and actuating rod means to selectively and independently cause pivotal motion in a selected direction of said gantry structure relative to said frame, said boom structure relative to said gantry structure, and said fork means relative to said boom structure;

roller means, movable with said articulated linkage means, for engaging said elevated surface and rollingly supporting thereon the weight of an article carried by said fork means; and deactivating means operable to prevent said second hydraulic cylinder and actuating rod means from vertically supporting said boom structure during engagement of said roller means with said elevated surface.

14. The device of claim 13 wherein:

said deactivating means include first and second normally closed hydraulic valve means connected in series in said hydraulic circuit means and operable when each is in an open position to dump hydraulic fluid from one of said internal cylinder portions, said first valve means being selectively movable between open and closed positions by an operator of said device, and position sensing means for sensing engagement of said roller means with said elevated surface and responsively opening said second valve means.

* * * * *

UNITED STATES PATENT AND TRADEMARK OFFICE

CERTIFICATE OF CORRECTION

PATENT NO. : 4,826,474

DATED : May 2, 1989

INVENTOR(S) : Arthur J. Holmes

It is certified that error appears in the above-identified patent and that said Letters Patent is hereby corrected as shown below:

Col. 17, Line 63, "55", should be --25--.

Col. 12, Line 12, between "a" and "forward", please insert --simultaneous--.

Signed and Sealed this

Ninth Day of January, 1990

*Attest:*

JEFFREY M. SAMUELS

*Attesting Officer* *Acting Commissioner of Patents and Trademarks*